United States Patent [19]

Syed

[11] Patent Number: 4,537,630
[45] Date of Patent: Aug. 27, 1985

[54] ACOUSTIC IMPEDANCE MEASUREMENT

[75] Inventor: Asif A. Syed, Loveland, Ohio

[73] Assignee: General Electric Company, Cincinnati, Ohio

[21] Appl. No.: 499,641

[22] Filed: May 31, 1983

[51] Int. Cl.³ ............................................. G01N 29/04
[52] U.S. Cl. ...................................................... 73/589
[58] Field of Search ......................... 73/589, 10 V, 579

[56] References Cited

U.S. PATENT DOCUMENTS 4,397,187  8/1983  Stribling .................................. 73/589

OTHER PUBLICATIONS

Article: Error Analysis of Spectral Estimates with Application to the Measurement of Acoustic Parameters Using Random Sound Fields in Ducts" by A. F. Seybert and Benjamin Soenarko, J. Acoust. Soc. Am., vol. 69, No. 4, Apr. 1981, pp. 1190-1199.

Primary Examiner—Anthony V. Ciarlante
Attorney, Agent, or Firm—Gregory A. Welte; Derek P. Lawrence

[57] ABSTRACT

An open-ended acoustic impedance tube is abutted against a material having a known acoustic impedance and a standing wave pattern is established in the tube. A first apparent impedance of the material is derived based on the standing wave pattern. A correction factor is computed based on the known impedance and the first apparent impedance. The open-ended impedance tube is then abutted against a sample material and a second apparent impedance is derived. The actual impedance of the sample is inferred from the second apparent impedance and the correction factor.

6 Claims, 6 Drawing Figures

ACOUSTIC IMPEDANCE MEASUREMENT

The present invention relates to the nondestructive measurement of the specific, normal acoustic impedance of materials.

BACKGROUND OF THE INVENTION

The specific, normal acoustic impedance ("acoustic impedance" herein) of a material gives information concerning the acoustic absorption and reflection of the material. Such knowledge is important in the noise control of gas turbine aircraft engines. Further, since the acoustic impedance is a function of the structure and composition of the material, knowledge of the acoustic impedance can be used in quality control testing.

FIG. 1 illustrates a prior art device 2, called an impedance tube, for measuring the acoustic impedance of a material. The device includes a cylindrical tube 3 which contains at one end an acoustic source 6 which generates planar sound waves 9. A piece 12 of the material to be tested is cut to the same diameter of the tube 3 and is inserted into the tube 3 so that a tight fit results at interfaces 15A, 15B, and 15C. An acoustically hard (that is, sound reflecting) plate 18 is fastened to the tube 3 behind the piece of material 12 and functions as a back plane. The acoustic source 6 projects incoming plane waves 9 of acoustic energy to the material 12. The material reflects some of the acoustic energy at surface 21 and the rest of the energy travels through the material 12 and is partially absorbed by the material. The plane wave energy reaching the back plane 18 is reflected toward the acoustic source 6. The waves reflected at the surface 21 and at the back plane 18 interact with incoming waves to form a standing wave pattern (not shown) in region 24 of the impedance tube.

The reflection coefficient of the material 12 at a given frequency can be calculated from the standing wave pattern in a known manner based on the measurements made by two acoustic transducers 27 and 29 together with knowledge of the distances 32 and 34, which are the distances separating the transducers 27 and 29 from the material 12, and knowledge of the speed of sound which is calculated from the temperature of the air in the tube. The acoustic impedance of the material 12 is readily derived from the reflection coefficient. Further information concerning such impendance computation is given in the article entitled, "Error Analysis of Spectral Estimates with Application to the Measurement of Acoustic Parameters using Random Sound Fields in Ducts," by A. F. Seybert and B. Soenarko, appearing in the *Journal of the Acoustic Society of America*, Vol. 69, No. 4, April 1981, which is hereby incorporated by reference.

The use of the impedance tube 2 in FIG. 1 suffers the disadvantage of employing a destructive method of testing. That is, the method is destructive in the sense that the piece of material 12 must be severed from a component whose impedance is to be measured in order to fit into the tube, thereby inflicting damage upon the component. In the case of aircraft components, the monetary cost of such damage is high.

OBJECTS OF THE INVENTION

It is an object of the present invention to provide new and improved acoustic impedance measurement.

It is a further object of the present invention to provide new and improved acoustic impedance measurement which is nondestructive.

It is a further object of the present invention to provide new and improved acoustic impedance measurement for the quality control testing of materials.

SUMMARY OF THE INVENTION

In one form of the present invention, an open-ended acoustic impedance tube is abutted against a material having a known acoustic impedance and a standing wave pattern is established in the tube. A first apparent impedance of the material is derived based on the standing wave pattern. A correction factor is computed based on the known impedance and the first apparent impedance. The open-ended impedance tube is then abutted against a sample material and a second apparent impedance is derived. The actual impedance of the sample is inferred from the second apparent impedance and the correction factor.

DETAILED DESCRIPTION OF THE INVENTION

Figure 2:
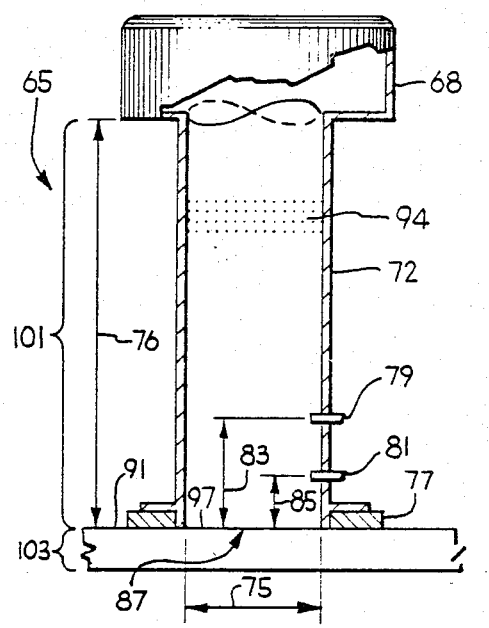
FIG. 2 depicts one form of the present invention.

In one form of the present invention, an impedance tube 65 of FIG. 2 is employed. The impedance tube 65 comprises acoustic source 68 in the form of a 30 watt, 16 ohm loudspeaker having a flat frequency response in the range of 500 to 22,000 Hz. One such speaker is Model No. 802D available from ALTEC Corporation, located in Anaheim, California.

The acoustic source 68 is fastened to an acoustic waveguide 72 which is a cylindrical tube of diameter 1.25 inches (dimension 75) and 9 inches tall (dimension 76. Affixed to the waveguide 72 at the end opposite the acoustic source is a flexible hard rubber flange 77. Attached to the waveguide 72 are two pressure transducers 79 and 81 at respective distances of 1.5 inches (dimension 83) and 0.7 inches (dimension 85) from the end 87 of the tube 65. The end 87 is open. One such transducer is Model No. 8510-15, having a range of 15 psig, operating range of 0-300 mv in output, a response of 21+6 mv/psi and available from ENDEVCO Corporation, located in San Juan Capistrano, California.

Applicant employs this open-ended impedance tube of FIG. 2 by abutting the tube 65 against a material 91 whose impedance is to be measured. The flange 77 assists in acoustically sealing the waveguide 72 with the material 91. The acoustic source 68 is activated in order to project plane waves 94 to the surface 97 of the material 91 in order to establish a standing wave pattern (not shown) in region 101 similar to that in region 24 of FIG. 1. However, since in FIG. 2 there is no structure analogous to the waveguide region 36 of FIG. 1, significant transverse propagation can occur in region 103 in FIG. 2. (Transverse propagation is further discussed later under the heading "General Considerations"). This transverse propagation distorts the impedance measurement as normally computed from data taken from the transducers 79 and 81. The transverse propagation introduces error into the impedance computation.

Figure 4:
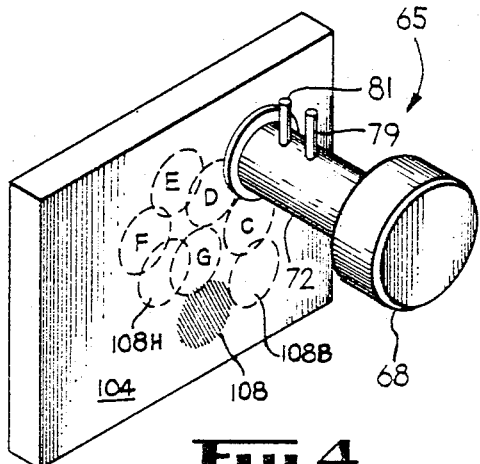
FIG. 4 depicts the use of one form of the present invention.

Applicant corrects for this error by deriving a correction factor which is then applied to the impedance computed from the measurements taken by the open-ended tube of FIG. 2. Applicant derives the correction factor by making one "apparent" impedance measurement using the open-ended impedance tube 65 at a location on the surface of a reference material 104 as shown in FIG. 4 by the hatched circle 108. (The impedance tube 2 is not shown abutting the hatched circle 108).

Figure 1:
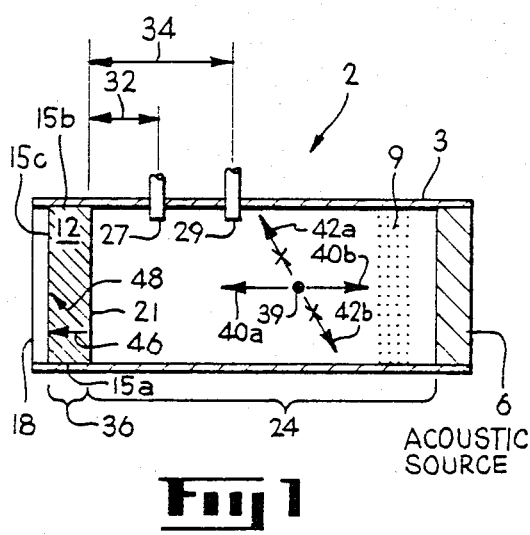
FIG. 1 depicts an acoustic impedance tube of the prior art.

Applicant further takes a destructive impedance measurement of the reference material 104, using the prior art impedance tube of FIG. 1. This measurement is performed upon the hatched section 108 after severing it from the reference material 104. The destructive impedance measurement yields an "actual" impedance measurement, as distinct from the apparent impedance value obtained from the open-ended measurements.

The correction factor is computed by taking the ratio of the actual impedance (measured destructively) to the apparent impedance: correction factor=actual impedance/apparent impedance. The correction factor is then used by repeating the open-ended measurements of FIG. 4, but upon sample materials whose impedance is to be tested. In these measurements, the open-ended impedance tube is positioned randomly upon the surface of the material, measurements are taken from the transducers 79 and 81, and the apparent impedance is computed from the transducer data and the dimensions 83 and 85 in FIG. 2. The apparent impedance is then multiplied by the correction factor. The result is an estimated actual impedance of the material, which experiment has shown to correlate to a high degree with the actual impedance when measured destructively in the apparatus of FIG. 1.

To repeat, an apparent impedance measurement of the reference material is taken nondestructively using the open-ended tube of the present invention. Then, a destructive impedance measurement of the same material is taken as known in the art. The actual and apparent impedances will, in general, be different. The correction factor is the ratio of the actual to the apparent impedance. Then, the open-ended tube is again used to measure apparent impedances of sample materials. These latter apparent impedances are multiplied by the correction factor to obtain estimates of the actual impedances of the samples. Of course, it is assumed that the samples are somewhat similar in structure and composition to the reference materials, as it would make no sense, for example, to derive a correction factor from actual and apparent impedance measurements of polystyrene foam and then to multiply apparent impedance measurements taken from a clay brick by the correction factor in order to estimate the impedance of the brick.

It is important that the apparent and actual impedance measurements be performed upon the same region of the material, such as region 108 in FIG. 4. Applicant has found that, in general, the apparent acoustic impedances of different regions, such as regions 108B–H, are different. Further, the actual impedances of these regions (as destructively measures) are also different. However, Applicant has found that the ratio between the actual and apparent impedances in a particular single region (e.g., in region 108) is substantially the same as the ratio in another, different region (e.g., region 108B). This finding allows the use of the correction factor described above. By contrast, a different, second, correction factor, taken as the ratio of the actual impedance of a region such as region 108 to the apparent impedance of a different region such as region 108B will, in general, give different results than the use of the correction factor described above. The use of this different correction factor is not contemplated in the prefered embodiment.

To further describe the present invention by way of contrast, a representative average of the actual impedances, such as the average of the appraent impedances of regions 108B–108H could be taken and then treated as representative of the apparent impedance of region 108. The ratio of the actual impedance of a region such as region 108 to this representative apparent impedance could than be used as a third correction factor. However, Applicant has found that the ratio of the actual impedance to the apparent impedance in a single region (e.g., region 108) provides a more accurate correction factor. Thus, the correction factor first described in this application is preferred.

A more generalized discussion of some of the relevant principles at work in the present invention is given under the following heading entitled "General Considerations".

GENERAL CONSIDERATIONS

The acoustic plane waves 9 in FIG. 1, when traveling inside the material 12, are constrained within a waveguide (namely, region 36 of the tube 3) which is congruent (i.e., having the same cross-sectional size and shape) with the waveguide through which they travel in the region 24 outside the material. That is, the waveguide (which is the tube 3) seen by the traveling waves does not change when they enter the material 12.

Accordingly, each molecule which supports the plane waves in both regions 24 and 36 can be viewed as vibrating back and forth in a direction perpendicular (i.e., normal) to the surface 21 of the material 12. That is, a molecule indicated as dot 39 is viewed as moving in the directions shown by arrows 40A and B and not (as shown by the crossing out) in the directions of arrows 42A and 42B. Viewed another way, the direction of acoustic propagation is always normal (i.e., perpendicular to surface 21) through the material 12 (arrow 46); there is substantially no transverse (i.e., non-normal) propagation (arrow 48) because of the congruity of waveguide regions 24 and 36.

Figure 3:
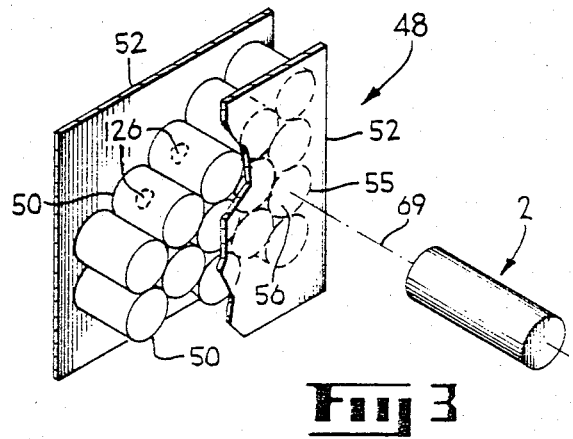
FIGS. 3 and 5 depict two different types of honeycomb cell laminates.

Some materials possess a self-contained waveguide which is congruent to the waveguide of the impedance tube 2. For example, as shown in FIG. 3, a laminated honeycomb material 48 contains circular honeycomb cells 50 between outer laminations 52. If the impedance tube 2 is coaxially (on axis 69) aligned with one of the cells 50 as shown and abutted against the laminate 52 (abutment not shown) and if that cell 50 is congruent with the impedance tube 2, then a section of the honeycomb material 48 need not necessarily be cut out for insertion into the impedance tube 2 as in FIG. 1, but the tube 2 may be abutted against the material coaxially with a cell 50 as shown for the impedance measurement. In such a case, the wall of cell 50 itself functions analogously to waveguide region 36 in FIG. 1 in resisting transverse propagation.

However, it is a rare occurrence that the material whose impedance is to be measured will have such a circular honeycomb configuration in which each cell is congruent with the waveguide of the impedance tube.

Further, even if it did, it would be difficult to align the impedance tube coaxially with a cell 50 as shown in FIG. 2 because the cell is concealed by the outer laminations 52.

Figure 5:
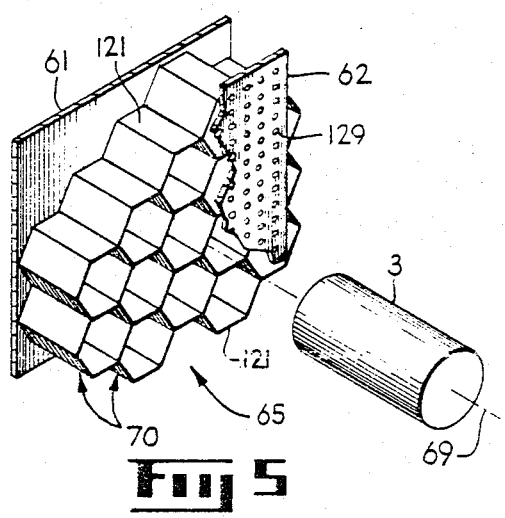

A more common laminate is shown in FIG. 5 which shows a laminated material having outer laminations 61 and 62 (lamination 62 being perforated) and a medial matrix 65, which is shown as a honeycomb core. The honeycomb cells 70 are hexagonal and thus are not congruent with a cylindrical waveguide 3.

Figure 6:
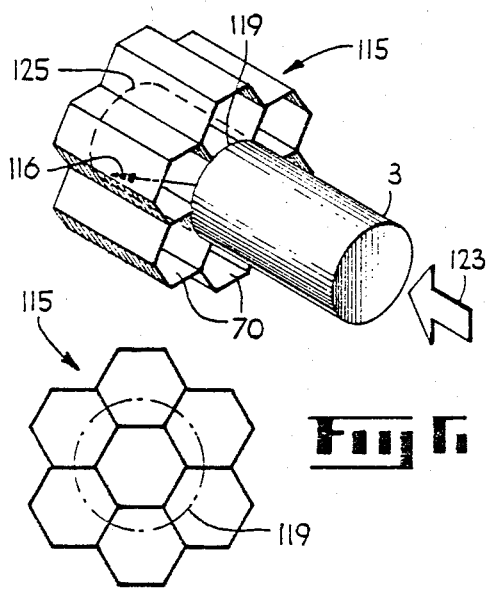
FIG. 6 illustrates a cylindrical waveguide abutting a cluster of hexagonal waveguides.

One result of the lack of congruity between the cylindrical waveguide 3 and the hexagonal honeycomb cells 70 is that the plane waves traveling through the waveguide 3, upon entering the medial matrix 65, immediately enter a waveguide having a new cross-sectional shape and size. This is more clearly shown in FIG. 6, which shows a cylindrical tube 3 abutting a surrogate waveguide comprising a cluster 115 of seven hexagonal cells 70. That Figure eliminates the outer lamination 62 in FIG. 5 for clarity. FIG. 6 is also shown in the plan view. The plane waves (not shown) entering the cluster 115 acquire a transverse (arrow 116) velocity component. The air molecules no longer vibrate normal to the surface (surface not shown in FIG. 6) of the honeycomb material. Thus, the change in waveguide shape at point 119 from cylindrical to a cluster of seven hexagonal tubes affects the impedance measurement.

The structures and events of FIGS. 5 and 6 can be characterized as follows. The medial matrix 65 is a cellular material including cells 70 which have cell walls 121. Lamination 61 in FIG. 5 is acoustically hard and adopts the function of replacing the back plane 18 in FIG. 1. Because of the differences in the cross-sectional size and shape of the impedance tube 3 with respect to the heavy boundary of the cluster 115, there is a mismatch between the waveguide outside the material (i.e., the tube 3) as opposed to the waveguide inside the medial matrix (i.e., the hexagon cluster 115). Inside the matrix there is no boundary of a waveguide which (1) extends in the normal direction (arrow 123), (2) is comprised of cell walls, and (3) is similar in cross-sectional size and shape to that of the tube 3. A dashed cylindrical boundary 125, which is congruent with the tube 3, meets these three requirements. However, dashed boundary 125 does not exist as a physical component. It is an imaginary boundary. Thus, transverse propagation can occur across dashed boundary 125, as opposed to the situation of FIG. 1, wherein means (i.e., waveguide region 36) are sued to diminish transverse propagation.

It is noted that transverse propagation can occur for other reasons than the lack of a congruent waveguide within the material. For example, even in the situation of FIG. 3, if there exist holes in the cell walls such as holes 126, the holes 126 allow transverse propagation and decrease the accuracy of the impedance measurement. Such holes are present in honeycomb aircraft components for purposes such as rainwater drainage.

With reference now to more specific aspects of the present invention, this nondestructive method of measurement of acoustic impedance can be used in a quality control check of the manufacture of material. For example, a reference material of known structure and composition is first nondestructively tested to find its apparent acoustic impedance at a marked location on its surface by means of the open-ended impedance tube and then is destructively tested to find the actual impedance of the marked location by use of the impedance tube 2 of FIG. 1. The correction factor is obtained as described above.

The apparent impedance of another, sample, material is then nondestructively measured using the present invention. The apparent impedance is multiplied by the correction factor in order to obtain the estimated actual impedance of the sample. The deviation from the estimated actual impedance of the sample from the measured actual impedance of the reference indicates that either the structure or the composition of the sample does not conform with that of the reference. For example, faulty adhesive application of the honeycomb of the medial matrix 65 to the laminations 61 and 62 can result in the presence of excess adhesive and the blockage of perforations 129 by the adhesive or in the presence of too little adhesive and consequent weakness of the junction. Either of these situations affects the acoustic impedance and this change can be measured by the open ended impedance tube described above.

The hard rubber flange 77 helps to minimize leakage of sound between the waveguide and the surface of the material sample during the measurement of the apparent acoustic impedance. The flexible flange 77 also enables the measurements to be made on surfaces with some curvature. A generally cylindrical surface having a radius of about 43 inches has been measured.

An invention has been described for the nondestructive, in situ inferential measurement of the acoustic impedance of a material. The invention measures the apparent acoustic impedance of a reference material by establishing a standing wave pattern in a waveguide which is abutted to the material at a marked location. The invention then measures the actual acoustic impedance of the same material by severing it from the marked location and measuring it in a destructive manner known in the art. A ratio of the two impedances is taken. This constitutes the correction factor for the particular design of the reference material. The apparent impedance measurement is repeated with respect to sample materials of the same design to obtain apparent impedances of the sample materials. These apparent impedances are corrected with the correction factor and the result is compared with the impedance of the reference material as measured destructively in the impedance tube. The invention is useful for measuring the sound absorptive properties of materials, such as aircraft engine nacelles, and for quality control testing of laminated materials during manufacture. Further, the present invention can be applied to materials other than laminates. Application to foam sheets, acoustic tiles, and carpeting, to name three materials, can be undertaken.

The term acoustic impedance has been used. It should be recognized that the acoustic impedance is so readily derived from the reflection coefficient of a material that, for purposes of interpreting the scope of the claims, a measurement of the reflection coefficient of a material can be tantamount to measurement of the impedance. Thus, the reference in the claims to acoustic impedance measurement is considered to also refer to measurement of reflection coefficient.

The destructive mesurement of materials in order to find the actual, as opposed to apparent, acoustic impedance has been discussed. However, this is not strictly necessary, as the purpose is that the actual impedance become known. It may be possible to learn the actual impedance from the manufacturer, or to otherwise make it known.

Numerous substitutions and modifications can be undertaken without departing from the true spirit and scope of the present invention as defined from the following claims.

I claim:

1. A method of inferring the actual acoustic impedance of a sample material which is similar in structure and composition to a reference material having a known acoustic impedance, comprising the following steps:
   (a) abutting a waveguide against a first sample material;
   (b) projecting acoustic energy through the waveguide to the first sample material for establishing a standing wave pattern in the waveguide;
   (c) deriving a first apparent acoustic impedance of the first sample material based on the standing wave pattern of (b);
   (d) deriving a correction factor based on the known acoustic impedance and the first apparent impedance of (c);
   (e) repeating the operations of steps (b) and (c), but with respect to a second sample material, for deriving a second apparent sample impedance; and
   (f) inferring the actual impedance of the second sample material of (e) as a function of the second apparent sample impedance of (e) and of the correction factor (d).

2. A method of measuring the acoustic impedance of a laminated material using acoustic energy propagated through an acoustic waveguide, the laminated material containing a surrogate waveguide definable therein which surrogate waveguide extends generally in the same direction as the acoustic waveguide, but is of different cross-sectional size and shape than the acoustic waveguide, the method comprising the following steps:
   (a) measuring an apparent impedance of the material by a procedure which includes abutting the waveguide against the material at a reference location and establishing a standing wave pattern of acoustic energy within the waveguide;
   (b) measuring the actual impedance of the material at the reference location of (a) by a procedure which includes inserting a severed segment of the material into an impedance tube and establishing a standing wave pattern within the impedance tube;
   (c) computing a correction factor as a function of the actual and the apparent impedances;
   (d) measuring an apparent impedance of a sample location on the material by a procedure which includes abutting the waveguide against the sample material and establishing a standing wave pattern of acoustic energy within the waveguide; and
   (e) computing an actual impedance of the sample location of (d) as a function of the correction factor and the sample apparent impedance.

3. A method, which includes the use of an acoustic waveguide, for measuring the acoustic impedance of a sample laminated material having normal and transverse directions definable therein, having a first, acoustically hard, outer face, and a second outer face, and having an internal cellular matrix such that no boundary exists in the matrix which
   (i) comprises walls of the cells
   (ii) extends in the normal direction
   (iii) diminishes acoustic propagation in the transverse directions
   (iv) is similar in size and shape to the cross-sectional shape of the acoustic waveguide, the method comprising the following steps:
   (a) measuring the actual acoustic impedance of a reference material which is similar in structure and composition to the sample material;
   (b) measuring the apparent acoustic impedance of the reference material without taking active measures to diminish transverse acoustic propagation;
   (c) deriving a correction factor based on the actual and apparent acoustic impedance values according to a predetermined formula;
   (d) measuring the apparent reflection coefficient of the sample material in a manner similar to the measurement of (b); and
   (e) inferring the actual acoustic impedance of the sample material from the apparent reflection coefficient of (d) and the correction factor of (c) according to a predetermined formula.

4. A method according to claim 3 in which the correction factor of (c) is obtained as a ratio of the actual acoustic impedance of the reference material to the apparent acoustic impedance measured in (b).

5. A method according to claim 3 in which the actual reflection coefficient of (e) is derived by multiplying the apparent reflection coefficient of (d) by the correction factor.

6. In the measurement of the acoustic impedance of a material, the improvement for compensating for transverse acoustic propagation which occurs within the material, the improvement comprising:
   (a) measuring the actual acoustic impedance of a reference material, the measurement including the use of means for diminishing transverse acoustic propagation within the material;
   (b) measuring an apparent acoustic impedance of the reference material, the measurement including the non-use of means for diminishing transverse acoustic propagation within the materials;
   (c) deriving a correction factor based on the actual and the apparent reflection coefficients;
   (d) repeating the measurement of (b), but upon a sample material; and
   (e) applying the correction factor to the apparent reflection coefficient measured in (e).

* * * * *